United States Patent

Marquardt et al.

[11] Patent Number: 5,119,808
[45] Date of Patent: Jun. 9, 1992

[54] RESPIRATOR WITH A PROTECTIVE COVERING OF COATED FABRIC

[75] Inventors: Wolfgang Marquardt, Stockelsdorf; Holmer Röhling, Reinfeld; Rudolf Greiff, Badendorf, all of Fed. Rep. of Germany

[73] Assignee: Dragerwerk Aktiengesellschaft, Lübeck, Fed. Rep. of Germany

[21] Appl. No.: 544,741

[22] Filed: Jun. 27, 1990

Related U.S. Application Data

[63] Continuation-in-part of Ser. No. 450,596, Dec. 13, 1989, abandoned.

[30] Foreign Application Priority Data

Apr. 6, 1990 [DE] Fed. Rep. of Germany ....... 4011222

[51] Int. Cl.⁵ .............................................. A62B 17/04
[52] U.S. Cl. .......................... 128/201.22; 128/201.23; 128/201.24
[58] Field of Search ...................... 128/202.26, 205.28, 128/201.25, 205.25, 201.23, 201.22, 201.24

[56] References Cited

U.S. PATENT DOCUMENTS

| | | |
|---|---|---|
| 3,521,629 | 7/1970 | Reynolds ........................ 128/201.23 |
| 4,440,164 | 4/1984 | Werjefelt ........................ 128/205.25 |
| 4,523,588 | 6/1985 | Dolsky ............................ 128/201.25 |
| 4,627,431 | 12/1986 | Werjefelt ........................ 128/201.25 |
| 4,637,383 | 1/1987 | Lopez ............................. 128/201.25 |

*Primary Examiner*—Edgar S. Burr
*Assistant Examiner*—Aaron J. Lewis
*Attorney, Agent, or Firm*—McGlew & Tuttle

[57] ABSTRACT

A respirator arrangement including a protective covering, particularly an antismoke hood, and a respiratory connection which is connected to a chemical that absorbs water vapor and $CO_2$ and releases oxygen, and whose covering or hood material consists of a coated composite material. The coated composite material includes a support fabric of tear-resistant, heat-resistant, and water vapor repellent fibers formed such that the material for the protective covering and the components carrying the respiratory gas stores or releases the smallest possible amount of water vapor, and is resistant to breakage and tearing while having elasticity and suppleness, and can be processed easily. The composite material has a support fabric 1 of glass fibers 2 that has a silane interlayer 5 as adhesion promoter, to which is applied a PVC coating 3 on the side facing the surroundings, and to which is applied a silicone coating 4 on the surface away from the PVC coating 3.

6 Claims, 1 Drawing Sheet

RESPIRATOR WITH A PROTECTIVE COVERING OF COATED FABRIC

RELATED APPLICATION INFORMATION

This application is a continuation in part of application Ser. No. 07/450,596 filed Dec. 13, 1989 now abandoned.

FIELD AND BACKGROUND OF THE INVENTION

This invention relates in general to a respirator with a protective covering and more particularly relates to an antismoke hood whose respiratory connection is combined with either chemical for absorbing water vapor and $CO_2$ and releasing oxygen, or with a filter. The respirator having a covering or hood material consisting of a coated composite material with a support fabric made of tear-resistant and heat-resistant fibers that repel water vapor.

BACKGROUND OF THE INVENTION

Such respirators, for example those with an antismoke hood as a protective covering, are used in unbreathable atmospheres and are intended to protect the wearer against the harmful effects of heat. The respirator itself is fastened at a suitable point, for example in front of the chest or in the neck area of the wearer, and is provided with has a flow connection inside the hood space. When putting on the respirator and after pulling the hood over the wearer's head, the chemical that releases oxygen, reacts and releases its oxygen.

The hood material itself consists of a fabric of tear-resistant, heat resistant, and water vapor-repellent material, for example glass fibers. This is coated with polytetrafluoroethylene (PTFE). The hood material is thus fire-resistant, light, and adaptable, so that the hood hinders the freedom of motion of the wearer as little as possible.

It is a drawback in known hood materials that the brittle glass fibers break too easily and the broken fibers do not withstand subsequent tearing stress, so that undesirable leaks or even holes are formed that destroy any effective respiratory protection. Such a hood material is also not resistant enough to the penetration of sharp objects. It is costly to process the known hood material, since precautions have to be taken in particular for the strength of the seams formed on the cut hood piece; cementing is not permanent because of the low adhesion to PTFE and seams frequently tear because of the brittleness of the fabric.

A protective clothing material was disclosed by DD-PS 213 597 whose support fabric consists of glass fibers and is provided with a silicone coating on at least one side. Silicone coatings have the drawback that because of their suppleness and stretch, they are poorly suited for processing of fabric webs into garment pieces. Cementing is also feasible only with substantial preparation steps because of the inadequate adhesion.

A flexible protective material is described in DE-AS 1 074 979 whose glass fiber fabric is coated on both sides with a plastic coating, one of which consists of a polyvinyl chloride (PVC) coating. Even though such coatings are somewhat suitable because of their impermeability to external pollutants and their processability, nevertheless they still leave something to be desired for pliable wearer comfort. Respirators with a chemical that is a source of oxygen and absorbs carbon-dioxide and water vapor (for example $KO_2$) are moisture-sensitive. Such respirators have to be sealed against water vapor and dry packaged so that water vapor diffusing into the package or liberated by the components during the storage of the respirator does not lead to premature activation of the chemical and unwanted release of oxygen. However, a sealed package is expensive, and drying the various components that are in air flow connection with the chemical requires an additional drying process. When extensive covering material, such as a hood for the head, is packaged with it, water vapor stored by the covering material may be released into the interior and to the chemical in spite of water vapor-tight packaging. To prevent this the chemical cartridge would also have to be sealed. Such equipment is described in DE-AS 11 95 602.

SUMMARY AND OBJECT OF THE INVENTION

It is an object of the invention, therefore, to improve a respirator of the type mentioned so that the material that is in flow connection with the chemical has the smallest possible storage or release of water vapor, and the protective covering can be processed easily in spite of its elasticity and suppleness with resistance to breakage and tearing, and that films comprising the covering adhere well to one another and to the support fabric.

This problem is solved by providing a composite material having a support fabric of glass fibers that has an interlayer of silane as adhesion promoter, to which a PVC coating is applied on one side toward the surroundings and to which a silicone coating is applied on the surface away from the PVC coating.

The advantage of the invention lies essentially in the fact that the inherently brittle glass fiber fabric both becomes supple from the silicone coating and also withstands folding stress, which leads to the tearing of the fabric. The silicone-coated glass fiber fabric is distinguished by the lack of absorption and storage of water vapor, which prevents later unwanted release of water vapor from the outset. The external PVC coating toward the surroundings provides a seal toward the outside that is impermeable to ga to a very great extent and facilitates the processability of the fabric material to make a protective covering, particularly a protective hood. More extensive processing of the fabric to make a complete protective garment that covers the entire body of the wearer is likewise more readily feasible with the features pursuant to the invention.

The silane interlayer provides for a strong adhesive bond between the silicone coating and the PVC coating, which otherwise would peel off, since they both now adhere to the silane interlayer with good adhesion.

Because of the lack of water vapor content and the low water vapor absorption of the coated fabric, a seal of the respirator containing the chemical to the lines carrying the respiratory gas is unnecessary, so that the equipment can be put to use without the time consuming step of breaking open a seal. Furthermore, all of the covering material can be placed in the packaging of a respirator with out special additional drying, with no need for concern that excessive emission of water vapor might lead to premature evolution of oxygen from the chemical.

The interlayer can be achieved in a particularly simple manner by impregnating the glass fiber fabric. The silicone and PVC coatings can be applied to the interlayer thus obtained with no further pretreatment.

Another favorable possibility for making an interlayer consists of applying a silane coating to the glass fiber fabric that serves on one side or both sides of the fabric as an adhesion promoter for the PVC and silicone coatings to be applied subsequently.

Silanes in solution or dispersion are suitable for the impregnation and for the coatings. Among them, for example, are organofunctional silanes with the structure of organodialkoxy or -trialkoxy compounds whose functional groups can be vinyl, methyl, amino, or mercapto groups, among others.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

DETAILED DESCRIPTION OF THE PREFERRED EMBODIMENT

Figure 1:
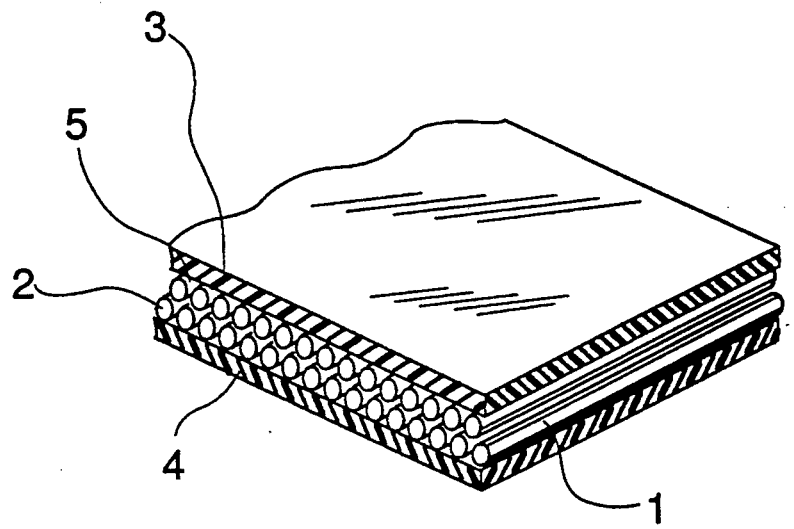
FIG. 1 is a cross sectional view through a piece of the composite material.

Referring to the drawings in particular, FIG. 1 illustrates a piece of fabric having three layers, with the center layer being a glass fiber fabric 1 whose individual glass fibers 2 are shown by their faces. The glass fiber fabric 1 is impregnated with silane as an adhesion promoter and in this way combines with the fabric 1 to form an interlayer 5. A silicone coating 4 and a PVC coating 3 are applied to the interlayer. The application of the silane may be in the form of a coating 5 on both sides of the glass fiber fabric which can also serve as an adhesion promoter, to which the PVC coating 3 and the silicone coating 4 are then applied.

Another favorable possibility for making an interlayer consists of applying a silane coating to the glass fiber fabric that serves as an adhesion promoter on one side or both sides of the fabric for the PVC and silicone coatings to be applied subsequently.

Liquid or soluble crystalline silanes are practical for impregnation and for coating.

The surface facing outward toward the surroundings or external environment in the later processing of the composite material is provided with the PVC coating 3. The surface of the interlayer 1 opposite the coating 3 is covered with the silicone coating 4 which forms the surface of the interior of the protective enclosure which faces a wearer.

Figure 2:
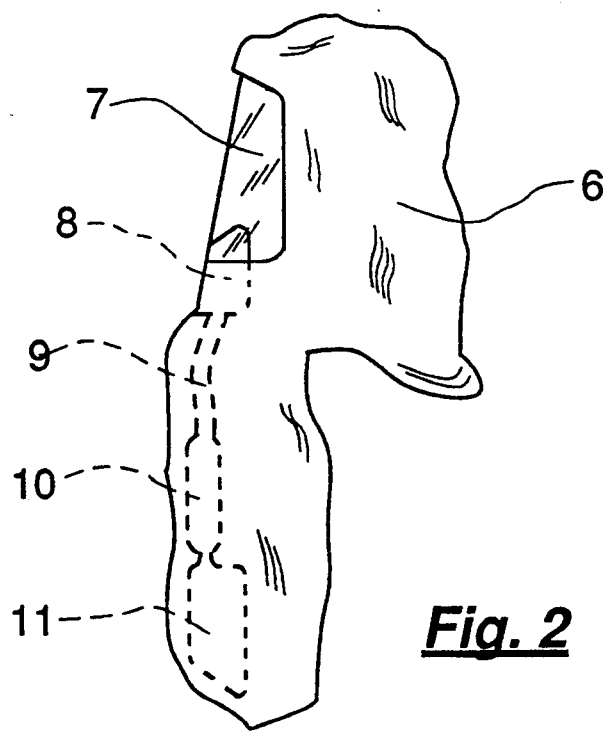
FIG. 2 is an illustration of a protective covering with an associated respirator.

A covering 6 is shown in FIG. 2 that covers both the head area and also the shoulder and back or chest areas of a person, not shown. A lens 7 is provided in the head area of the covering 6, beneath which a half-mask 8 is connected to a respirator 10 with a connecting hose 9. The respirator has a chemical cartridge, not shown, with a chemical that absorbs the water vapor and $CO_2$ from the expired air and releases oxygen.

While a specific embodiment of the invention has been shown and described in detail to illustrate the application of the principles of the invention, it will be understood that the invention may be embodied otherwise without departing from such principles.

What is claimed is:

1. A respirator and protective enclosure arrangement comprising: a coated composite protective material including a support fabric formed of tear resistant, heat resistant and moisture repelling glass fibers; a silane interlayer as an adhesion promotor; a polyvinyl chloride (PVC) coating provided on a first side of said carrier fabric, forming an environment facing side; and a silicone coating on a side of said support fabric facing away from said polyvinyl chloride coating, forming an interior side, the respirator including means for providing breathable air to a user and being positioned on said interior side.

2. A respirator and protective enclosure arrangement according to claim 1, wherein said interlayer is formed by impregnating the glass fiber fabric with silane.

3. A respirator and protective enclosure according to claim 1, wherein said interlayer is formed by applying said silane as a coating on at least one side of said glass fiber.

4. A respirator and protective hood assembly comprising; protective hood material formed of a fiberglass support fabric with a silane interlayer and having a first outerside coated with polyvinyl chloride and a second innerside coated with --silicone--; breathing equipment means positioned on the interior of said fabric, including a moisture and a $CO_2$ absorbing, as well as oxygen delivering chemical.

5. A respirator and protective hood assembly according to claim 4, wherein said breathing equipment means includes a breathing bag and a breathing tube, each of said breathing bag and said breathing tube being formed of said compound material.

6. A respirator and protective hood arrangement comprising:
said protective hood including a fiberglass support fabric;
a silane coating on said fiberglass support fabric to form a coated fiberglass support fabric;
a polyvinyl chloride layer on one side of said coated fiberglass support fabric; and
a silicone layer on an opposite side of said coated fiberglass support fabric, the respirator including means for providing breathable air to a user and being positioned on said opposite side.

* * * * *